United States Patent
Fan et al.

(10) Patent No.: US 9,218,538 B2
(45) Date of Patent: Dec. 22, 2015

(54) METHODS AND SYSTEMS FOR DETECTING AN OBJECT BORDERLINE

(71) Applicant: Xerox Corporation, Norwalk, CT (US)

(72) Inventors: Zhigang Fan, Webster, NY (US); Hengzhou Ding, Webster, NY (US); Yonghui Zhao, Cupertino, CA (US); Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 20 days.

(21) Appl. No.: 13/753,790

(22) Filed: Jan. 30, 2013

(65) Prior Publication Data

US 2014/0211023 A1 Jul. 31, 2014

(51) Int. Cl.
| | |
|---|---|
| *H04N 9/73* | (2006.01) |
| *H04N 5/225* | (2006.01) |
| *H04N 5/228* | (2006.01) |
| *G06K 9/20* | (2006.01) |
| *G06K 9/32* | (2006.01) |
| *G06K 9/46* | (2006.01) |
| *G06T 7/00* | (2006.01) |

(52) U.S. Cl.
CPC ............ *G06K 9/2027* (2013.01); *G06K 9/3233* (2013.01); *G06K 9/4633* (2013.01); *G06T 7/0085* (2013.01); *G06T 7/0097* (2013.01); *G06T 2207/10152* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 4,712,248 A * | 12/1987 | Hongo | 382/199 |
| 5,974,175 A * | 10/1999 | Suzuki | 382/199 |
| 6,927,862 B2 | 8/2005 | Iwasaki | |
| 7,127,083 B2 | 10/2006 | Han et al. | |
| 7,200,246 B2 | 4/2007 | Cofer et al. | |
| 7,340,380 B2 | 3/2008 | Klotz et al. | |
| 7,889,116 B2 | 2/2011 | Harada et al. | |
| 8,224,176 B1 | 7/2012 | Pillman et al. | |
| 2007/0058717 A1* | 3/2007 | Chosak et al. | 375/240.08 |
| 2007/0296552 A1* | 12/2007 | Huang et al. | 340/10.5 |
| 2008/0193119 A1* | 8/2008 | Miyazaki | 396/157 |
| 2011/0285837 A1* | 11/2011 | Bello et al. | 348/79 |
| 2012/0097002 A1 | 4/2012 | Thiedig | |
| 2012/0147205 A1 | 6/2012 | Lelescu et al. | |
| 2013/0293734 A1* | 11/2013 | Fan et al. | 348/222.1 |

* cited by examiner

*Primary Examiner* — Aung S Moe
*Assistant Examiner* — Euel Cowan
(74) *Attorney, Agent, or Firm* — Luis M. Ortiz; Kermit D. Lopez; Kevin Soules

(57) ABSTRACT

Methods and systems for detecting an object borderline. A first image with respect to the object can be captured by an image-capturing unit without a flash light and borderlines of the object can be detected. If the detection is successful, the detected borderlines can be outputted. Otherwise, a second image with respect to the object can be captured by the image-capturing unit by applying a flash light and the borderlines can be detected in the image. A geometric transformation between the two images can then be estimated. Finally, the border lines in the first image can be determined by transforming the borderlines detected in the second image. Such an approach effectively detects the appliance borderlines and avoids artifacts caused by applying flash.

20 Claims, 7 Drawing Sheets

METHODS AND SYSTEMS FOR DETECTING AN OBJECT BORDERLINE

FIELD OF THE INVENTION

Embodiments are generally related to electronic manuals. Embodiments are also related to appliance model identification. Embodiments are additionally related to image-processing devices and techniques. Embodiments are further related to the detection of an object borderline.

BACKGROUND

Paper instruction manuals are currently an essential part of appliance packaging. Electronic manuals rather than paper manuals not only save costs, but also are more environmentally friendly. Hence, it is necessary to identify a model of an appliance in order to provide the correct manual.

Conventionally, borderlines of panel surfaces can be detected for appliance model identification. The detected borderlines can provide perspective information essential for 3-D (3-Dimensional) reconstruction and matching and shape (e.g., aspect ratio) data associated with the panel surfaces, which can be employed as a part of a feature set for model identification. Such detected borderlines also provide a boundary that specifies a region of interest (the panel surface) in which the components and features are then extracted for further identification. A mobile communications device, for example, such as a Smartphone may be employed optically to measure the front and back panel of an appliance to identify its features, components, and product model.

One of the problems associated with such an approach involves lighting, particularly because images are usually captured by an appliance owner who is typically not experts in imaging. Quite often, even when the overall ambient light is sufficient, it is still not possible to ensure that all borderlines are detectable. For example, FIG. 1 illustrates an image 100 of an appliance captured by an image-capturing unit. A left border 111 of a panel is hardly perceptible in the image 100. FIG. 2 illustrates an image 150 of an appliance captured by an image-capturing unit with a flash on. The object at the front receives most of the light and can be easily distinguishable from the background. A panel surface 160 in FIG. 2 indicates a strong unevenness in illumination. In other instances, oversaturation in lighting may wash away image details which are captured with a flash as depicted in FIG. 3. Also, the image details of the receptacles may be lost due to a flash, particularly compared with FIG. 4, which is taken without a flash.

Based on the foregoing, it is believed that a need exists for an improved method and system for detecting an object borderline, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved appliance model identification methods and systems.

It is another aspect of the disclosed embodiments to provide for improved image-processing devices and techniques.

It is a further aspect of the disclosed embodiments to provide for an improved method and system for detecting an object borderline by adaptively applying a flash light.

The aforementioned aspects and other objectives and advantages can now be achieved as described herein. Methods and systems for detecting an object borderline are disclosed herein. In an example embodiment, a first image with respect to an object (e.g., appliance surface panel) can be captured by an image-capturing unit without a flash light and borderlines of the object can be detected. If the detection is successful, the detected borderlines can be outputted. Otherwise, a second image with respect to the object can be captured by the image-capturing unit by applying a flash light and the borderlines can be detected in the image. A geometric transformation between the two images can then be estimated. Finally, the borderlines in the first image can be determined by transforming the borderlines detected in the second image. Such an approach effectively detects the object borderlines and avoids artifacts caused by applying flash.

The edges can be detected in the image and the detected edges can then be linked into straight lines utilizing a transformation algorithm, for example, Hough transformation. Two pairs of lines can be selected that can best construct a rectangle. The second image can be captured almost immediately after the first image so that the image capturing unit position and orientation does not change substantially in between. A movement can be modeled by a translation followed by a small rotation. A translation and rotation parameter can be estimated by matching the two images. Specifically, the second image can be correlated to the first image utilizing different translation and rotation parameter and the estimated parameter maximizes the correlation. The maximization can be initially optimized over translation and then over rotation. The borderlines detected in the second image can be mapped to the first image utilizing the translation and rotation parameter.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 2 illustrates an image of an appliance captured by the image-capturing unit with flash on;

FIG. 3 illustrates an image of an appliance captured by an image-capturing unit with flash on;

DETAILED DESCRIPTION

Figure 1:
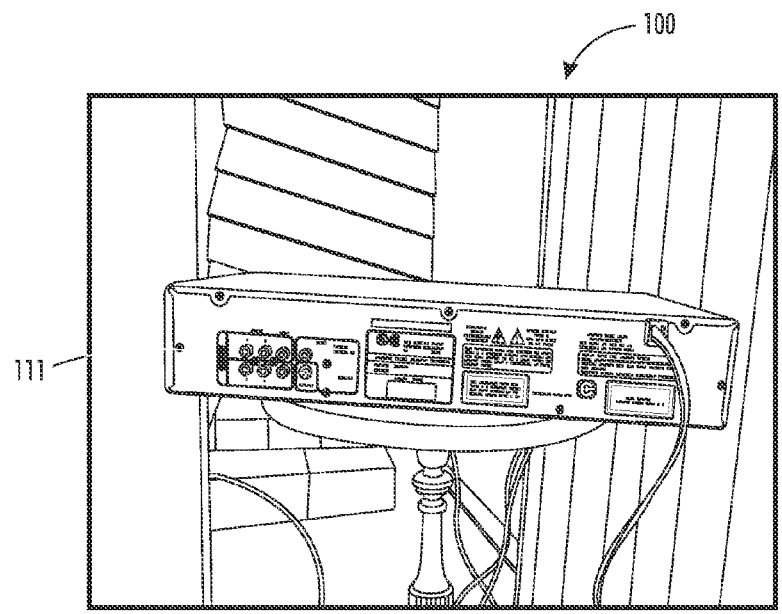
FIG. 1 illustrates an image of an appliance captured by an image-capturing unit.
Figure 2:
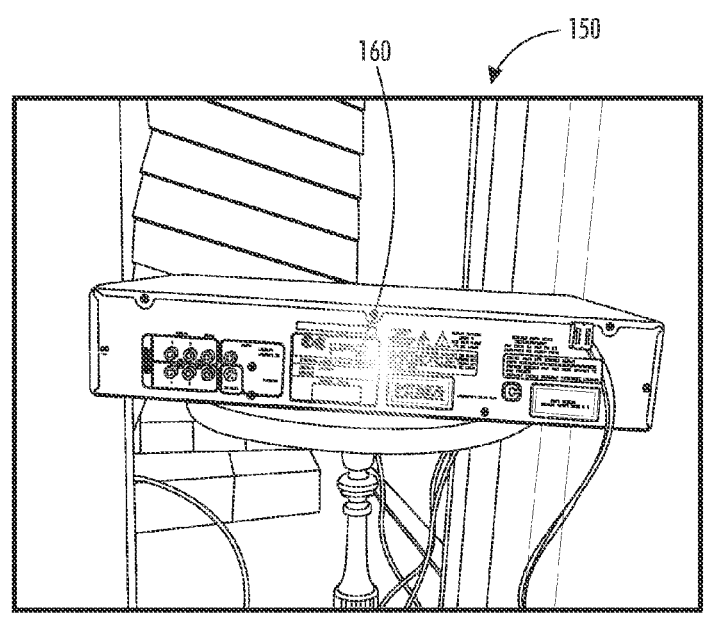
Figure 3:
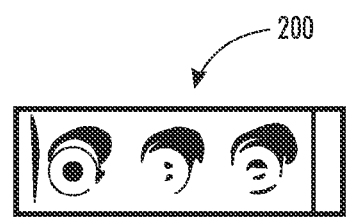
Figure 4:
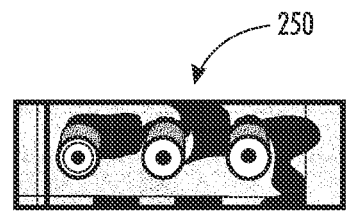
FIG. 4 illustrates an image of an appliance captured by the image-capturing unit with flash off.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 5:
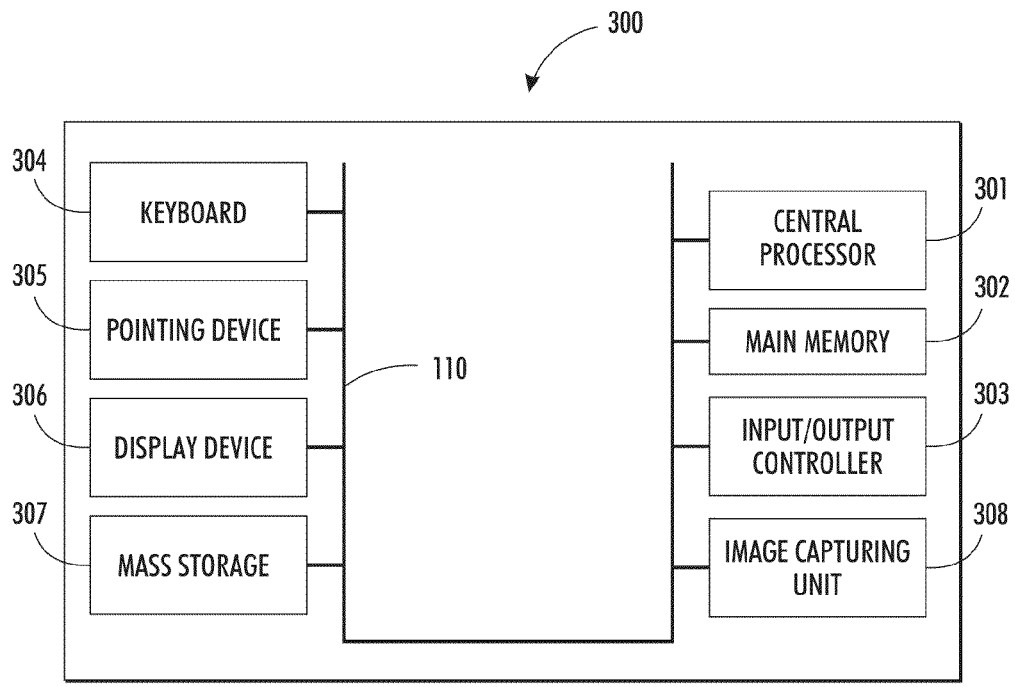
FIG. 5 illustrates a schematic view of a computer system, in accordance with the disclosed embodiments.
Figure 6:
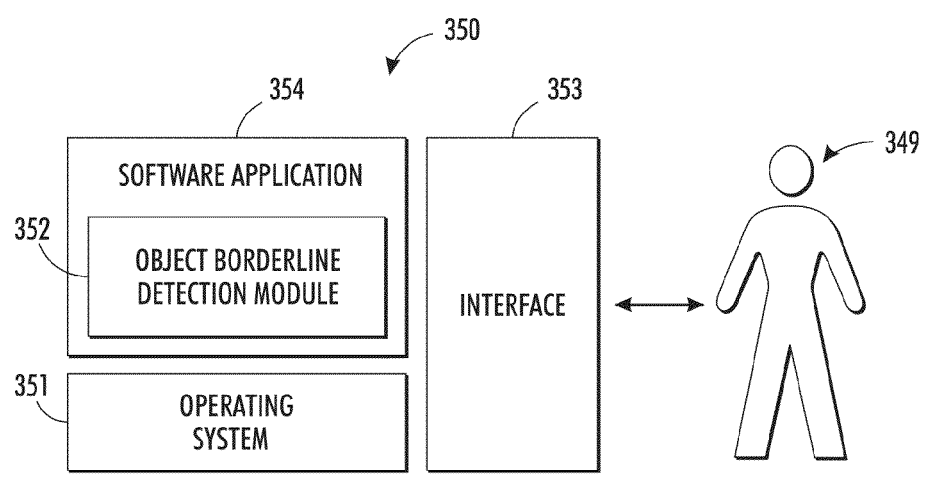
FIG. 6 illustrates a schematic view of a software system including an object borderline detection module, an operating system, and a user interface, in accordance with the disclosed embodiments.

FIGS. 5-6 are provided as exemplary diagrams of data-processing environments in which embodiments of the present invention may be implemented. It should be appreciated that FIGS. 5-6 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 5, the disclosed embodiments may be implemented in the context of a data-processing system 300 that includes, for example, a system bus 110, a central processor 301, a main memory 302, an input/output controller 303, a keyboard 304, an input device 305 (e.g., a pointing device such as a mouse, track ball, and pen device, etc.), a display device 306, a mass storage 307 (e.g., a hard disk), and an image-capturing unit 308. In some embodiments, for example, a USB peripheral connection (not shown in FIG. 5) and/or other hardware components may also be in electrical communication with the system bus 110 and components thereof. As illustrated, the various components of data-processing system 300 can communicate electronically through the system bus 110 or a similar architecture. The system bus 110 may be, for example, a subsystem that transfers data between, for example, computer components within data-processing system 300 or to and from other data-processing devices, components, computers, etc.

FIG. 6 illustrates a computer software system 350 for directing the operation of the data-processing system 300 depicted in FIG. 5. Software application 354, stored in main memory 302 and on mass storage 307, generally includes a kernel or operating system 351 and a shell or interface 353.

One or more application programs, such as software application 354, may be "loaded" (i.e., transferred from mass storage 307 into the main memory 302) for execution by the data-processing system 300. The data-processing system 300 receives user commands and data through user interface 353; these inputs may then be acted upon by the data-processing system 300 in accordance with instructions from operating system module 351 and/or software application 354.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 353, which is preferably a graphical user interface (GUI), also serves to display results, whereupon the user may supply additional inputs or terminate the session. In an embodiment, operating system 351 and interface 353 can be implemented in the context of a "Windows" system. It can be appreciated, of course, that other types of systems are possible. For example, rather than a traditional "Windows" system, other operation systems such as, for example, Linux may also be employed with respect to operating system 351 and interface 353. The software application 354 can include, for example, an object borderline detection module 352. Software application 354 and/or module 352 can include instructions such as those of method 500 depicted in FIG. 8.

FIGS. 5-6 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 7:
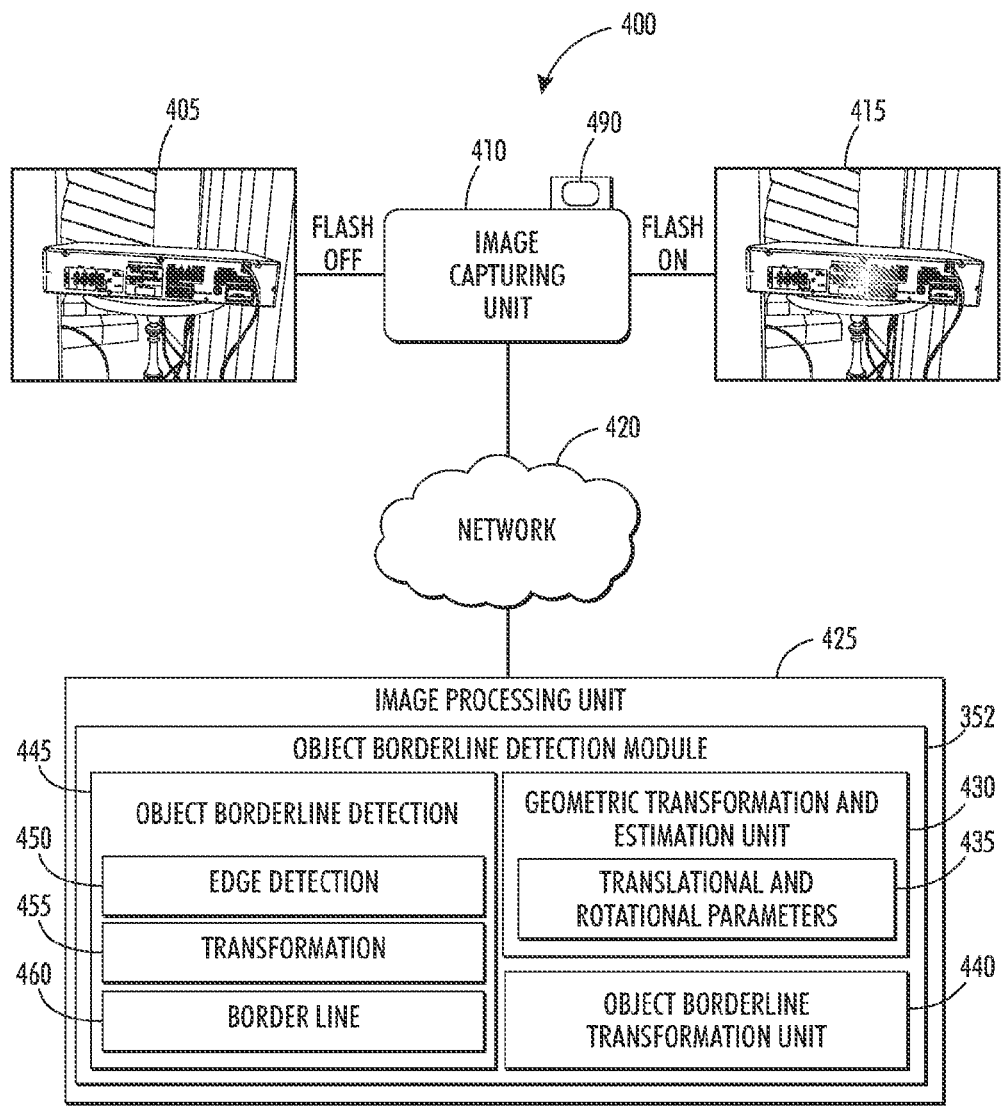
FIG. 7 illustrates a block diagram of an object borderline detection system, in accordance with the disclosed embodiments.

FIG. 7 illustrates a block diagram of an object borderline detection system 400, in accordance with the disclosed embodiments. Note that in FIGS. 5-12, identical or similar blocks are generally indicated by identical reference numerals. The object borderline detection system 400 can be configured to include the object borderline detection module 352 in association with an image-capturing unit 410 to detect an object borderline 460 with respect to an object (e.g., appliance) by adaptively applying a flash light 490. The object borderline can be detected to identify the model of the appliance and to provide a correct electronic manual. The image-capturing unit 410 captures a first image 405 of an object such as, for example, an appliance surface panel without the flash light 490 and transfers the first image 405 to an image processing unit 425 via a network 420.

Note that the network 420 may employ any network topology, transmission medium, or network protocol. The network 420 may include connections such as wire, wireless communication links, or fiber optic cables. Network 420 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

The image-capturing unit 410 can be operated as a handheld device. Note that the image-capturing unit 410 described in greater detail herein is analogous or similar to the image-capturing unit 308 of the data-processing system 300, depicted in FIG. 5. The image-capturing unit 410 may include built-in integrated functions such as image processing, data formatting, and data compression functions. Also, the unit 410 includes imager-positioning, range-finding, and a flash bulb 490.

The image processing unit 425 receives the image 405 from the image-capturing unit 410 in order to process the image 405. The image processing unit 425 is preferably a small, handheld computer device or palmtop computer as depicted in FIG. 5 that provides portability and is adapted for easy mounting. The image processing unit 425 further includes an object borderline detection module 445 to detect the borderlines 460 of the object with respect to the first image 405. The object borderline detection module 445 output the detected borderline 460, if the detection is successful. Otherwise, the image-capturing unit 410 captures a second image 415 by applying the flash light 490. The borderline detection module 445 detects the borderline 460 of the second image 415.

For example, as the object panel surfaces are typically rectangular, the borderlines 460 are composed of two pairs of parallel (in 3-D) straight lines that are orthogonal (also in 3-D) to each other. The borderline detection module 445 detects the borderlines 460 by first detecting the edges 450 in the image. The detected edges 450 can then be linked into straight lines using a transformation algorithm 455, for example, Hough Transform. Two pairs of lines are selected that can best construct a rectangle. In general, Hough transform find imperfect instances of objects within a certain class of shapes by a voting procedure. This voting procedure is carried out in a parameter space, from which object candidates are obtained as local maxima in a so-called accumulator space that is explicitly constructed by the algorithm for computing the Hough transform.

A geometric transformation estimation unit 430 estimates a geometric transformation between the two images 405 and 415. The second image 415 is captured almost immediately after the first image 405. It can therefore be reasonably assumed that the image-capturing unit 410 position and orientation do not change that much in between. Nevertheless, a small movement can still be expected. The movement can be modeled by a translation followed by a small rotation. The geometric transformation estimation unit 430 estimates translation and rotation parameters 435 by matching the two images 405 and 415.

Specifically, the second image 415 can be correlated to the first image 405 utilizing different translation and rotation parameters 435. The estimated parameters 435 are the parameters that maximize the correlation. Practically, the maximization can be decomposed into two steps, first optimized over translation and then over rotation, because rotation is typically very small. An object borderline transformation unit 440 can determine borderlines in the first image 405 by transforming the borderlines 460 detected in the second image 415 utilizing the translation and rotation parameters 435.

Figure 8:
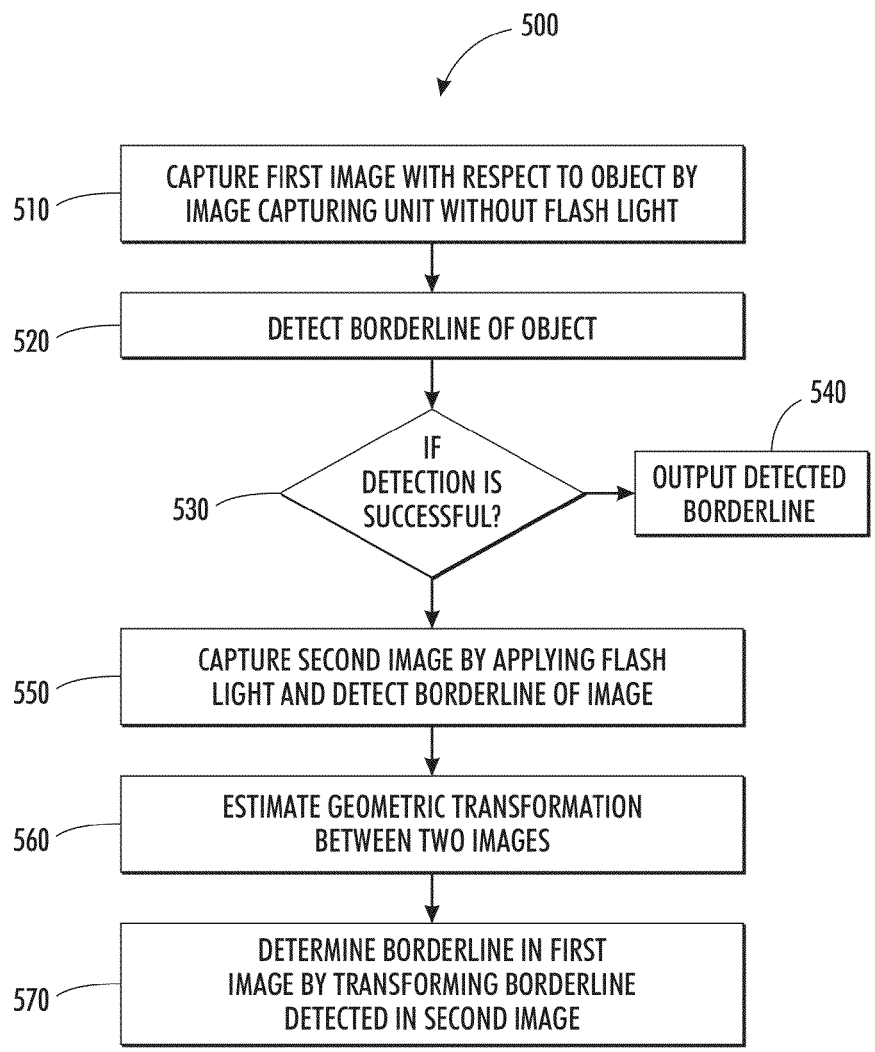
FIG. 8 illustrates a high level flow chart of operations illustrating logical operational steps of a method detecting an object borderline by adaptively applying a flash light, in accordance with the disclosed embodiments.

FIG. 8 illustrates a high level flow chart of operations illustrating logical operational steps of a method 500 for detecting the object borderline 460 by adaptively applying the flash light 490, in accordance with the disclosed embodiments. It can be appreciated that the logical operational steps shown in FIG. 8 can be implemented or provided via, for example, a module such as module 352 shown in FIG. 6 and can be processed via a processor such as, for example, the processor 301 shown in FIG. 5. Initially, the first image 405 with respect to the object (e.g., appliance surface panel) can be captured by an image-capturing unit 410 without the flash light 490 and borderlines 460 of the object can be detected, as illustrated at blocks 510 and 520. A determination can be made whether the detection is successful, as shown at block 530.

If the detection is successful, the detected borderlines 460 can be outputted, as depicted at block 540. Otherwise, the second image 415 with respect to object can be captured by the image-capturing unit 410 by applying the flash light 490 and the borderlines 460 can be detected in the image, as illustrated at block 550. A geometric transformation between the two images can then be estimated, as shown at block 560. Finally, the border lines in the first image 405 can be determined by transforming the borderlines 460 detected in the second image 415, as indicated at block 570.

Figure 9:
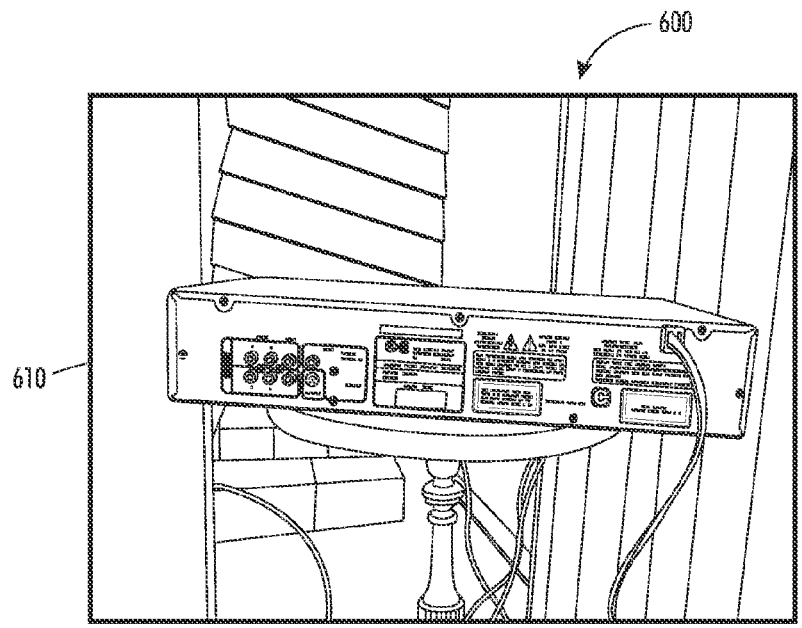
FIG. 9 illustrates a first image of an appliance captured by an image-capturing unit, in accordance with the disclosed embodiments.
Figure 10:
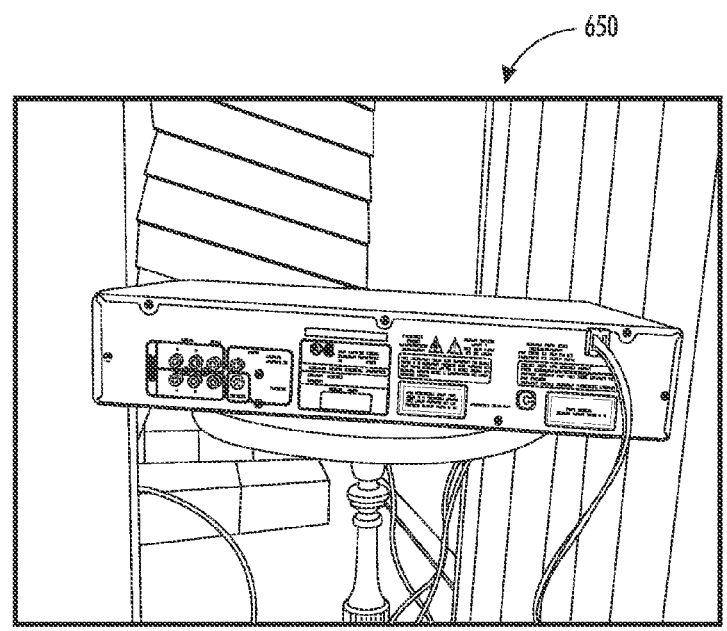
FIG. 10 illustrates a second image of an appliance captured by the image-capturing unit by applying the flash light, in accordance with the disclosed embodiments.
Figure 11:
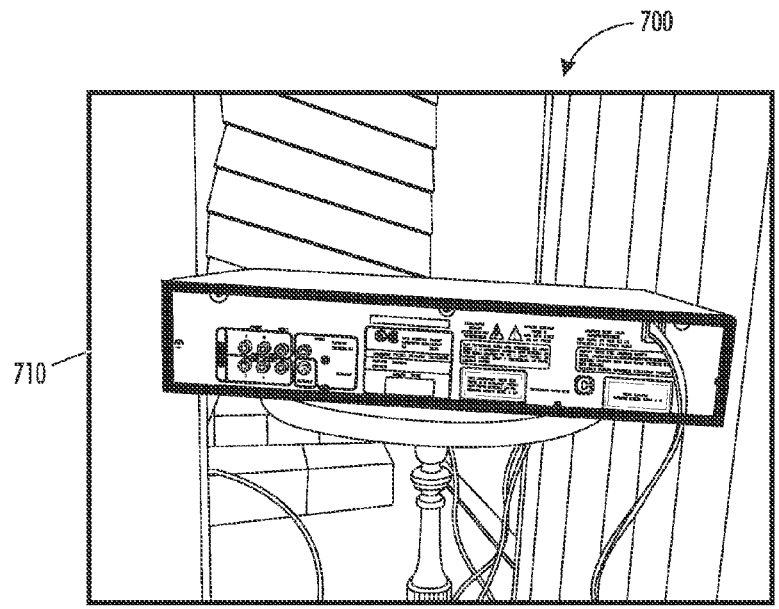
FIG. 11 illustrates the second image shown in FIG. 10 with a borderline detection result, in accordance with the disclosed embodiments.
Figure 12:
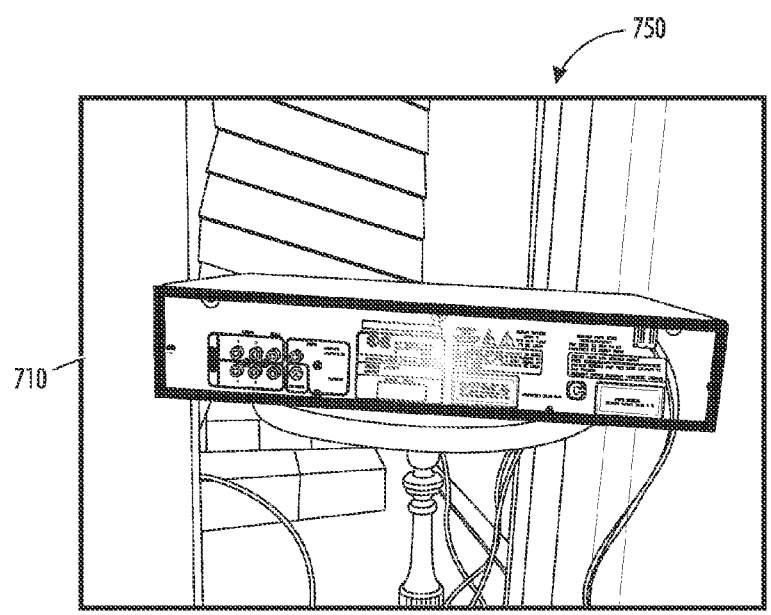
FIG. 12 illustrates the first image with a borderline mapped from the second image, in accordance with the disclosed embodiments.

FIG. 9 illustrates a first image 600 of an appliance captured by the image-capturing unit 410, in accordance with the disclosed embodiments. The borderline detection fails as a left border 610 of the appliance is missing as the panel surface color is very close to the background color. FIG. 10 illustrates a second image 650 of the appliance captured by the image-capturing unit 410 by applying flash, in accordance with the disclosed embodiments. A borderline detection result 700 of the second image 650 is illustrated in FIG. 11, A borderline of the image 650 can be mapped to the first image 600, as shown in FIG. 12. Such an approach effectively detects the appliance borderlines and avoids artifacts caused by applying the flash 490.

Based on the foregoing, it can be appreciated that a number of embodiments, preferred and alternative, are disclosed herein. For example, in one embodiment, a method can be implemented for detecting an object borderline. Such a method can include the steps or logical operations of, for example, capturing a first image with respect to an object via an image-capturing unit without a flash light to thereafter detect and output at least one borderline with respect to the object if a detection thereof is successful; capturing a second image with respect to the object by the image-capturing unit by applying of a flash light to thereafter detect at least one borderline in the second image if the detection is not successful; and estimating a geometric transformation between the first image and the second image to determine the at least one border line in the first image by transforming the at least one borderline detected in the second image to detect the object borderline.

In another embodiment, steps or logical operations can be implemented for linking the at least one borderline detected in the first image and the second image into a straight line utilizing a transformation algorithm and selecting at least two pairs of lines that can best construct a rectangle. In yet another embodiment, the transformation algorithm can be a Hough transformation algorithm. In still another embodiment, a step or logical operation can be implemented for capturing the second image immediately after the first image so that the image-capturing unit position and orientation does not change substantially therebetween.

In another embodiment, a step or logical operation can be implemented for modeling a movement by a translation followed by a small rotation and estimating a translation and rotation parameter by matching the first image and the second image. In another embodiment, a step or logical operation can be provided for correlating the second image to the first image utilizing the translation and rotation parameter and maximizing the correlation by the translation and rotation parameter. In another embodiment, the maximization can be initially optimized over the translation and then over the rotation. In another embodiment, a step or logical operation can be implemented for mapping the at least one borderline detected in the second image to the first image utilizing the translation and rotation parameter.

In another embodiment, a step or logical operation can be provided for detecting an object borderline. Such a system can include, for example, a processor and a data bus coupled to the processor. Such a system can also include a computer-usable medium embodying computer program code, wherein the computer-usable medium is coupled (e.g., electronically connected) to the data bus. The computer program code can include instructions executable by the processor and configured, for example, for capturing a first image with respect to an object via an image-capturing unit without a flash light to thereafter detect and output at least one borderline with respect to the object if a detection thereof is successful; capturing a second image with respect to the object by the image-capturing unit by applying of a flash light to thereafter detect at least one borderline in the second image, if the detection is not successful; and estimating a geometric transformation between the first image and the second image to determine the at least one border line in the first image by transforming the at least one borderline detected in the second image to detect the object borderline.

In some embodiments, such instructions can be further configured for linking the at least one borderline detected in the first image and the second image into a straight line utilizing a transformation algorithm and selecting at least two pairs of lines that can best construct a rectangle. In other embodiments, the transformation algorithm may be a Hough transformation algorithm. In other embodiments, such instructions can be further configured for capturing the second image immediately after the first image so that the image-capturing unit position and orientation does not change substantially in between.

In yet other embodiments, such instructions can be further configured for modeling a movement by a translation followed by a small rotation and estimating a translation and rotation parameter by matching the first image and the second image. In still other embodiments, such instructions can be further configured for correlating the second image to the first image utilizing the translation and rotation parameter and maximizing the correlation by the translation and rotation parameter.

In other embodiments, the maximization can be initially optimized over the translation and then over the rotation. In still other embodiments, such instructions can be further configured for mapping the at least one borderline detected in the second image to the first mage utilizing the translation and rotation parameter.

In another embodiment, a processor-readable medium storing code representing instructions to cause a process for detecting an object borderline can be implemented. Such code can include code to, for example, capture a first image with respect to an object via an image-capturing unit without a flash light to thereafter detect and output at least one borderline with respect to the object if a detection thereof is successful; capture a second image with respect to the object by the image-capturing unit by applying a flash light to thereafter detect at least one borderline in the second image if the detection is not successful; and estimate a geometric transformation between the first image and the second image to determine the at least one border line in the first image by transforming the at least one borderline detected in the second image to detect the object borderline.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for detecting an appliance borderline, said method comprising:
   capturing a first image of an appliance via an image-capturing unit without a flash light to thereafter detect and output at least one borderline with respect to said appliance if a detection thereof is successful;
   capturing a second image of said appliance by said image-capturing unit with application of a flash light to thereafter detect at least one borderline in said second image if a detection of said at least one borderline from said first image is not successful;
   estimating a geometric transformation between said first image and said second image to determine said at least one borderline in said first image by transforming said at least one borderline detected in said second image to detect said appliance borderline; and
   identifying a model of said appliance from said at least one borderline detected in at least one of said first image and said second image.

2. The method of claim 1 further comprising:
   linking said at least one borderline detected in said first image and said second image into a straight line utilizing a transformation algorithm; and
   selecting at least two pairs of lines that can best construct a rectangle.

3. The method of claim 2 wherein said transformation algorithm comprises a Hough transformation algorithm.

4. The method of claim 1 further comprising capturing said second image immediately after said first image so that said image-capturing unit position and orientation does not change substantially therebetween.

5. The method of claim 1 further comprising modeling a movement by a translation followed by a small rotation and estimating a translation and rotation parameter by matching said first image and said second image.

6. The method of claim 1 further comprising correlating said second image to said first image utilizing said translation and rotation parameter and maximizing said correlation by said translation and rotation parameter.

7. The method of claim 6 further comprising providing an electronic manual for said appliance based on said identified model.

8. The method of claim 1 further comprising mapping said at least one borderline detected in said second image to said first image utilizing said translation and rotation parameter.

9. A system for detecting an appliance borderline, said system comprising:
   a processor;
   a data bus coupled to said processor; and
   a computer-usable medium embodying computer program code, said computer-usable medium being coupled to said data bus, said computer program code comprising instructions executable by said processor and configured for:
   capturing a first image of an appliance via an image-capturing unit without a flash light to thereafter detect and output at least one borderline with respect to said appliance if a detection thereof is successful;
   capturing a second image of said appliance by said image-capturing unit with application of a flash light to thereafter detect at least one borderline in said second image if a detection of said at least one borderline from said first image is not successful;
   estimating a geometric transformation between said first image and said second image to determine said at least one borderline in said first image by transforming said at least one borderline detected in said second image to detect said appliance borderline; and
   identifying a model of said appliance from said at least one borderline detected in at least one of said first image and said second image.

10. The system of claim 9 wherein said instructions are further configured for:
    linking said at least one borderline detected in said first image and said second image into a straight line utilizing a transformation algorithm; and
    selecting at least two pairs of lines that can best construct a rectangle.

11. The system of claim 10 wherein said transformation algorithm comprises a Hough transformation algorithm.

12. The system of claim 9 wherein said instructions are further configured for capturing said second image immediately after said first image so that said image-capturing unit position and orientation does not change substantially in between.

13. The system of claim 9 wherein said instructions are further configured for modeling a movement by a translation followed by a small rotation and estimating a translation and rotation parameter by matching said first image and said second image.

14. The system of claim 9 wherein said instructions are further configured for correlating said second image to said first image utilizing said translation and rotation parameter and maximizing said correlation by said translation and rotation parameter.

15. The system of claim 14 wherein said instructions are further configured for providing an electronic manual for said appliance based on said identified model.

16. The system of claim 9 wherein said instructions are further configured for mapping said at least one borderline detected in said second image to said first image utilizing said translation and rotation parameter.

17. A non-transitory processor-readable medium storing code representing instructions to cause a process for detecting an appliance borderline, said code comprising code to:
    capture a first image of an appliance via an image-capturing unit without a flash light to thereafter detect and output at least one borderline with respect to said appliance if a detection thereof is successful;
    capture a second image of said appliance by said image-capturing unit with application of a flash light to thereafter detect at least one borderline in said second image if a detection of said at least one borderline from said first image is not successful;
    estimate a geometric transformation between said first image and said second image to determine said at least one borderline in said first image by transforming said at least one borderline detected in said second image to detect said appliance borderline;
    identifying a model of said appliance from said at least one borderline detected in at least one of said first image and said second image; and
    providing an electronic manual for said appliance based on said identified model.

18. The non-transitory processor-readable medium of claim 17 wherein said code further comprises code to:
    link said at least one borderline detected in said first image and said second image into a straight line utilizing a transformation algorithm; and
    select at least two pairs of lines that can best construct a rectangle.

19. The non-transitory processor-readable medium of claim 18 wherein said transformation algorithm comprises a Hough transformation algorithm.

20. The non-transitory processor-readable medium of claim 17 wherein said code further comprises code to:
    capture said second image immediately after said first image so that said image-capturing unit position and orientation does not change substantially therebetween; and
    model a movement by a translation followed by a small rotation and estimating a translation and rotation parameter by matching said first image and said second image.

* * * * *